(12) United States Patent
Kanai

(10) Patent No.: US 8,698,366 B2
(45) Date of Patent: Apr. 15, 2014

(54) FLAT TYPE VIBRATION MOTOR

(75) Inventor: Naoki Kanai, Ueda (JP)

(73) Assignees: Nidec Semitsu Corporation, Ueda-shi (JP); Sanyo Seimitsu Co., Ltd, Nagano (JP)

( * ) Notice: Subject to any disclaimer, the term of this patent is extended or adjusted under 35 U.S.C. 154(b) by 181 days.

(21) Appl. No.: 13/022,053

(22) Filed: Feb. 7, 2011

(65) Prior Publication Data

US 2011/0266901 A1 Nov. 3, 2011

(30) Foreign Application Priority Data

Apr. 28, 2010 (JP) ................................. 2010-103346

(51) Int. Cl.
 *H02K 7/06* (2006.01)
 *H02K 7/10* (2006.01)

(52) U.S. Cl.
 USPC .............................. 310/81; 310/90; 310/67 R

(58) Field of Classification Search
 USPC ........................................... 310/81, 90, 67 R
 See application file for complete search history.

(56) References Cited

U.S. PATENT DOCUMENTS

| | | | |
|---|---|---|---|
| 6,828,705 B1 * | 12/2004 | Choi et al. ........................ | 310/81 |
| 7,626,295 B2 * | 12/2009 | Yamaguchi ...................... | 310/81 |
| 7,687,949 B2 * | 3/2010 | Lee et al. ......................... | 310/83 |
| 2001/0040413 A1 * | 11/2001 | Yamaguchi ...................... | 310/81 |
| 2004/0135444 A1 * | 7/2004 | Choi et al. ........................ | 310/81 |
| 2004/0256931 A1 * | 12/2004 | Choi et al. ........................ | 310/81 |
| 2006/0091747 A1 * | 5/2006 | Yamaguchi et al. ............. | 310/81 |
| 2007/0057586 A1 * | 3/2007 | Park et al. ........................ | 310/81 |
| 2007/0145841 A1 * | 6/2007 | Zhao et al. ....................... | 310/81 |
| 2007/0194642 A1 * | 8/2007 | Yamaguchi et al. ............. | 310/81 |
| 2008/0018187 A1 * | 1/2008 | Yamaguchi et al. ............. | 310/81 |
| 2008/0157611 A1 * | 7/2008 | Ki ..................................... | 310/81 |
| 2008/0278012 A1 * | 11/2008 | Matsubara ....................... | 310/81 |
| 2009/0267434 A1 * | 10/2009 | Park .................................. | 310/81 |
| 2010/0148604 A1 * | 6/2010 | Park et al. ........................ | 310/81 |

FOREIGN PATENT DOCUMENTS

JP 2008-182837 A1 8/2008
WO WO 2009107787 A1 * 9/2009

* cited by examiner

*Primary Examiner* — Tran Nguyen
*Assistant Examiner* — Alex W Mok
(74) *Attorney, Agent, or Firm* — Westerman, Hattori, Daniels & Adrian, LLP

(57) ABSTRACT

A flat type vibration motor realizing strong fastening of a rotor frame and an eccentric weight without welding, that is, a flat type vibration motor provided with a cover case having a tubular part with an opening closed by a stator structure and supporting one end of a shaft and with a rotor frame supported to be able to rotate via a slide bearing through which the shaft runs and having an axial direction field-type rotary magnet and an eccentric weight, wherein the rotor frame has a disk part having a burring part into which a slide bearing is fitted and at least one rivet hole, while the eccentric weight has a covering part superposed over the disk part at the side opposite to the stator structure, at least one rivet which is inserted from the covering part through the rivet hole and have heads which are crushed at the stator structure side of the disk part, and an eave-shaped taper part hanging down from the covering part over the outer circumferential edge of the disk part to the stator structure side.

7 Claims, 5 Drawing Sheets

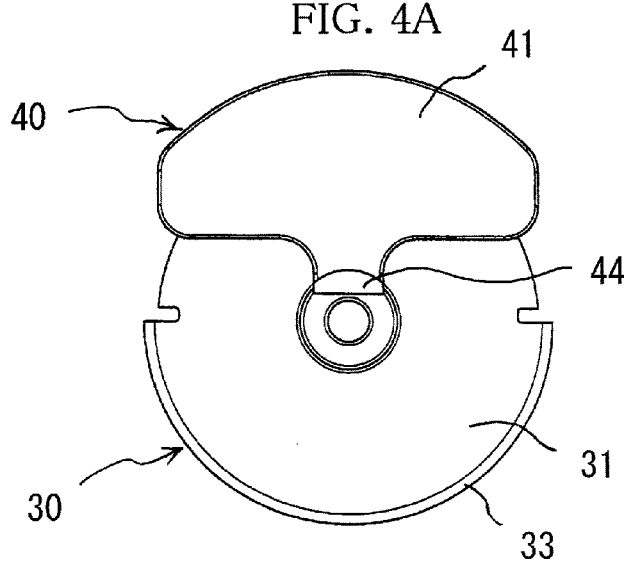
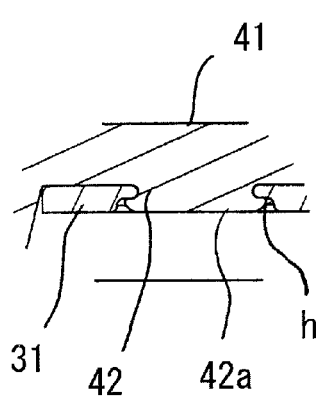
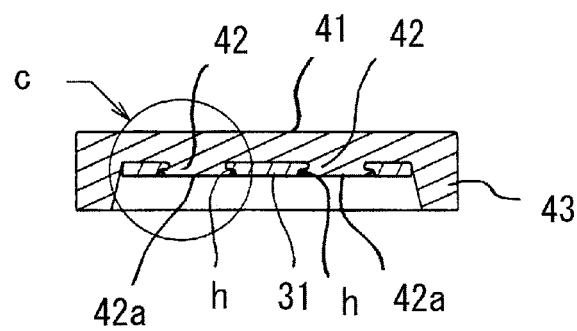
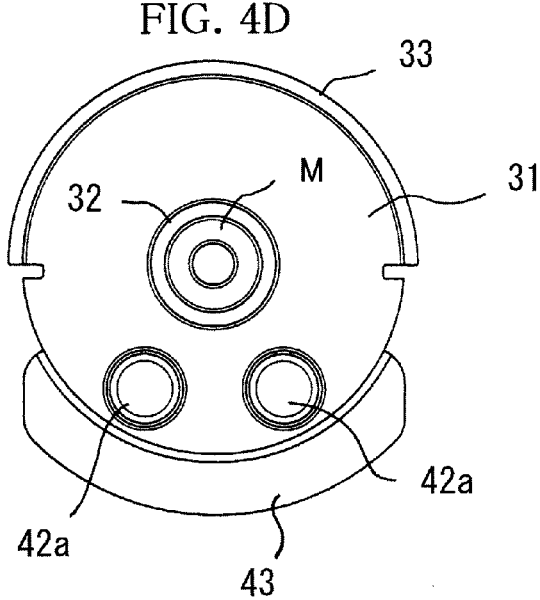

FLAT TYPE VIBRATION MOTOR

BACKGROUND OF THE INVENTION

1. Field of the Invention

The present invention relates to a flat type vibration motor built into a mobile phone etc., more particularly relates to its rotor structure.

2. Description of the Related Art

In the past, a flat type vibration motor has been provided with a stainless steel disk-shaped base plate on which one end of a shaft is press-fitted into a burring part, a closed-bottom cylindrically shaped cover case made of stainless steel in which an open part is closed by the base plate and the other end of the shaft is inserted into a shaft mounting hole, a rotor frame supported to be able to rotate via a slide bearing through which the shaft runs and having an axial direction field-type rotary magnet and an eccentric weight, and a flexible printed circuit board superposed on the base plate and mounting a plurality of electronic components such as air core coils and a current control IC. The rotor frame has the burring part attached to the slide bearing and a disk part having a ring-shaped rotary magnet and a fan-shaped eccentric weight at the outer circumferential side of the rotary magnet.

As related art, there is Japanese Patent Publication (A) No. 2008-182837 (FIG. 2 and FIG. 3).

In the above flat type vibration motor, the high specific gravity alloy fan-shaped eccentric weight is integrally joined with the disk part of the rotor frame by spot welding at several points, so easily is corroded along with the elapse of time. Further, the slide bearing to which the burring part of the rotor frame is attached has a ring-shaped projection for swaging use at its outer circumferential surface, so a specially shaped slide bearing is required and higher cost is incurred.

SUMMARY OF THE INVENTION

In view of the above problems, a first object of the present invention is to provide a flat type vibration motor which realizes strong fastening of the rotor frame and the eccentric weight by a means other than welding. A second object of the present invention is to provide a flat type vibration motor which can use an ordinary cylindrically shaped slide bearing.

The present invention provides a flat type vibration motor provided with a cover case having a tubular part with an opening closed by a stator structure and supporting one end of a shaft and with a rotor frame supported to be able to rotate via a slide bearing through which the shaft runs and having an axial direction field-type rotary magnet and an eccentric weight, wherein the rotor frame has a burring part into which the slide bearing is fitted and at least one rivet hole, while the eccentric weight has a covering part superposed over the rotor frame at the side opposite to the stator structure and at least one rivet which is inserted from the covering part through the rivet hole and has a head which is crushed at the stator structure side.

In such a rotor structure, since the eccentric weight is riveted to the rotor frame by its own rivet, sufficient fastening strength can be secured even without welding.

Preferably, the rotor frame has the rivet hole at the disk part, and the eccentric weight has an eave-shaped taper part hanging down from the covering part over the outer circumferential edge of the disk part to the stator structure side.

Further, since the covering part of the eccentric weight is supposed at the disk part at the side opposite to the stator structure, the eccentric weight may have a bearing holder extending from the covering part and striking and stopping an end face of the slide bearing.

Even if the rotor frame moves up and down in the axial direction, the slide bearing fitted into the burring part is prevented from detaching by the bearing holder, so it is possible to use an ordinary cylindrically shaped slide bearing as the slide bearing and lower cost can be realized.

Summarizing the advantageous effects of the present invention, according to the present invention, it is possible to provide a flat type vibration motor realizing strong fastening of the rotor frame and eccentric weight by a means other than welding.

BRIEF DESCRIPTION OF THE DRAWINGS

These and other objects and features of the present invention will become clearer from the following description of the preferred embodiments given with reference to the attached drawings, wherein:

FIG. 2A is a cross-sectional view showing an assembly of the rotor frame and eccentric weight in the flat type vibration motor, while

FIG. 4A is a plan view of the assembly, FIG. 4B is a cross-sectional view of the same, FIG. 4C is an enlarged cross-sectional view of a part "c" in FIG. 4B, and FIG. 4D is a bottom view of the same.

DESCRIPTION OF PREFERRED EMBODIMENTS

Figure 1:
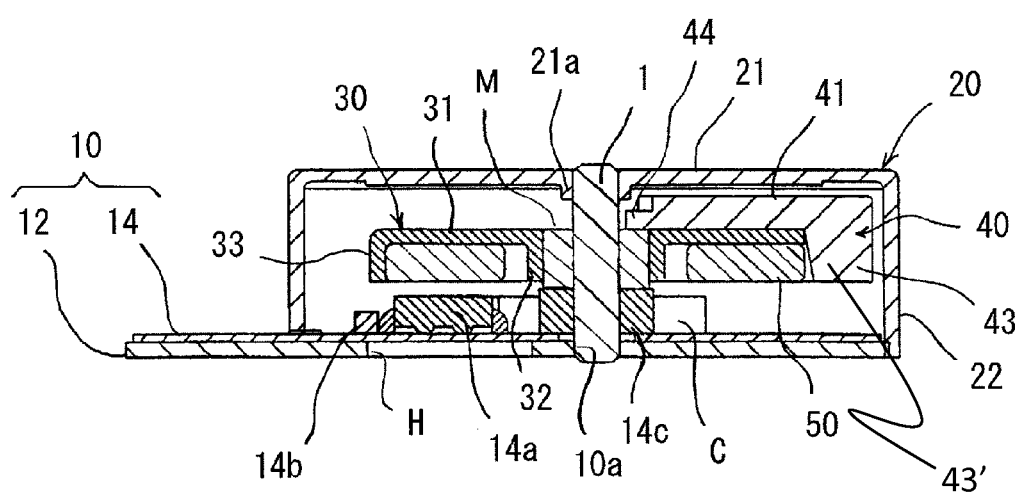
FIG. 1 is a longitudinal cross-sectional view of the appearance of a flat type vibration motor according to an embodiment of the present invention.
Figure 2A:
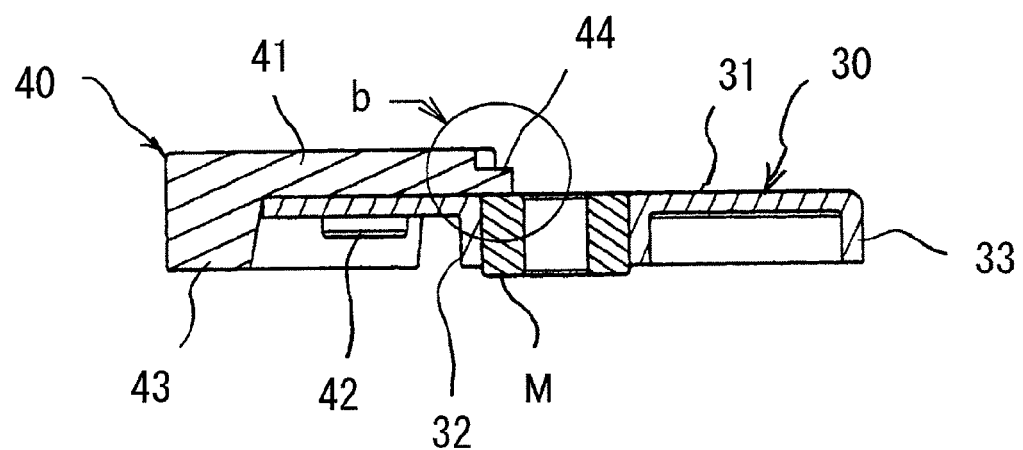
Figure 2B:
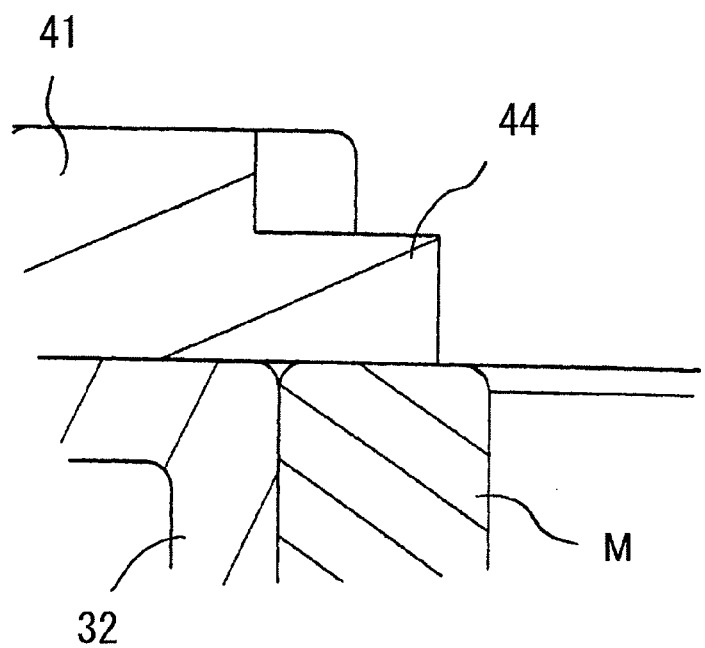
FIG. 2B is an enlarged cross-sectional view of a part "b" in FIG. 2A.
Figure 3:
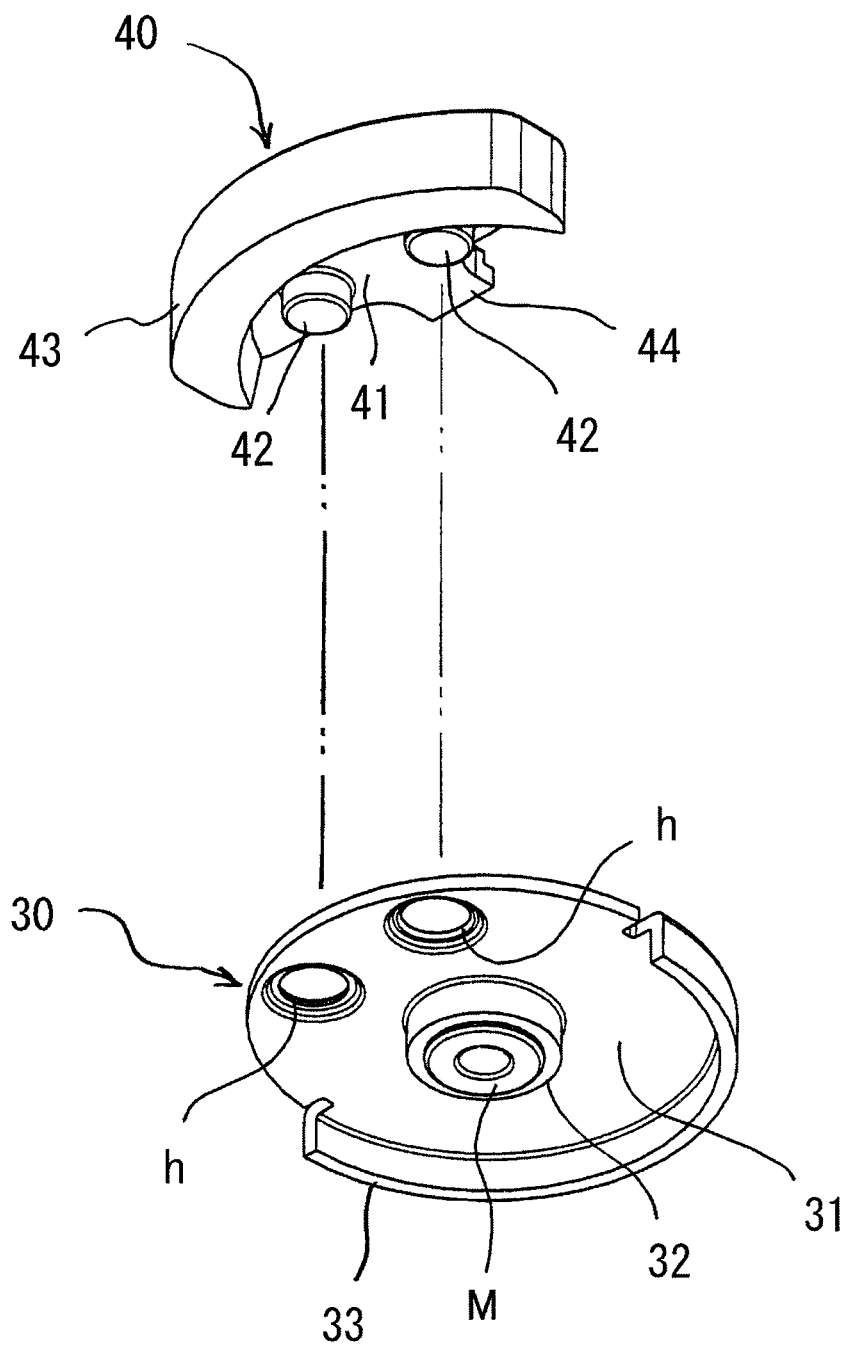
FIG. 3 is an assembled perspective view of the rotor frame and the eccentric weight.
Figure 5A:
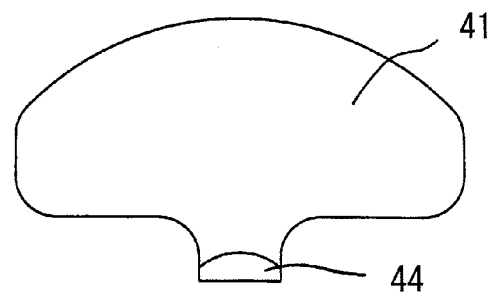
FIG. 5A is a plan view of the eccentric weight.
Figure 5C:
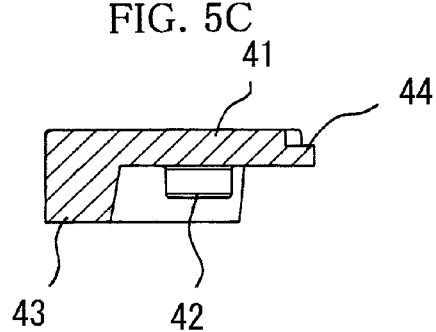
FIG. 5C is a cross-sectional view of the same.
Figure 5B:
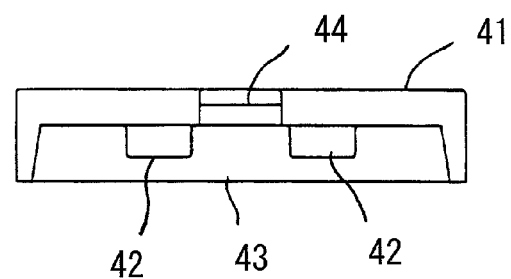
FIG. 5B is a front view of the same.
Figure 5D:
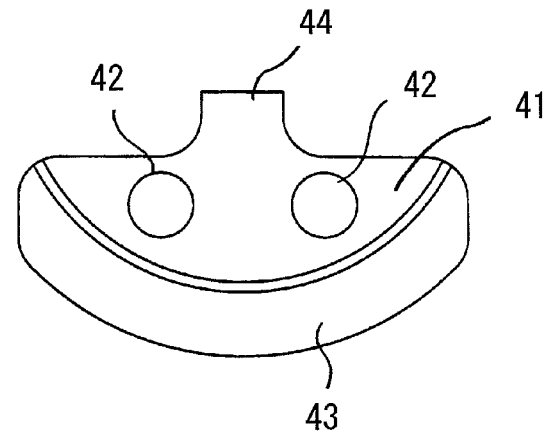
FIG. 5D is a bottom view of the same.

Next, an embodiment of the present invention will be explained with reference to the attached drawings. The flat type (coin type) vibration motor of the present example is a brushless motor. As shown in FIG. 1, this is provided with a stator structure 10 having an axial hole 10a into which one end of a shaft (supporting shaft) 1 is press-fitted, a closed-bottom flat tubular-shaped stainless steel cover case 20 having a burring part 21a into which the other end of the shaft 1 is inserted, and a rotor frame 30 supported to be able to rotate through an ordinary cylindrically shaped slide bearing (radial bearing) M through which the shaft 1 runs and having an axial direction field-type ring-shaped rotary magnet 50 and an arc-shaped eccentric weight 40. The opening of the tubular part 22 of the cover case 20 is closed by the stator structure 10.

The stator structure 10 of this example has a steel, substantially disk-shaped magnetic metal plate (base plate) 12 having three dented torque-generating fan-shaped holes H at its center and a flexible printed circuit board 14 superposed over this magnetic metal plate 12. On the flexible printed circuit board 14, a plurality electronic components such as air core coils C, a current control IC 14a for switching the feed of power to these air core coils C, and a capacitor 14b are mounted. Further, on the flexible printed circuit board 14, a plastic washer 14c through which the shaft 1 runs is mounted. On the surface of the plastic washer 14c, the bottom end face of the slide bearing M is received.

The rotor frame (rotor yoke) 30 of this example is a press-formed part and has, as shown in FIGS. 3A and 3B and FIGS. 4A to 4D, a burring part 32 descending from the center of the disk part 31 and having the slide bearing M inserted into it, two rivet holes "h" formed at the disk part 31 at adjoining locations at equal distances from the center, and a circumferential wall part 33 descending from a semi-circular edge of the disk part 31 at the opposite side from the two rivet holes "h".

On the other hand, the eccentric weight 40, as shown in FIGS. 3A and 3B and FIGS. 5A to 5D, monolithically has a covering part 41 superposed over the disk part 31 at the side opposite to the stator structure, rivets 42 inserted from this covering part 41 into the rivet holes "h" and having rivet heads 42a crushed at the stator structure side of the disk part 31, an eave-shaped taper part 43 hanging down from the covering part 41 over the outer peripheral edge of the disk part 31 to the stator structure side, and a thin bearing holder 44 extending from the covering part 41 and striking and stopping the end face of the slide bearing M.

In such a rotor structure, since the eccentric weight 40 is riveted to the disk part 31 of the rotor frame 30, sufficient fastening strength can be secured even without welding.

Further, since the covering part 41 of the eccentric weight 40 is superposed on the disk part 31 at the side opposite to the stator structure, it is possible to employ a configuration where the eccentric weight 40 has a bearing holder 44 extending from the covering part 41 and striking and stopping an end face of the slide bearing M.

Even if the rotor frame 30 moves up or down in the axial direction, the slide bearing M inserted into the burring part 32 is prevented from detachment by the bearing holder 44, so it is possible to use an ordinary cylindrically shaped slide bearing as the slide bearing M and possible to realize lower cost.

While the invention has been described with reference to specific embodiments chosen for purpose of illustration, it should be apparent that numerous modifications could be made thereto by those skilled in the art without departing from the basic concept and scope of the invention.

As one embodiment, FIG. 1 illustrates a flat type vibration motor. The cover case 20 has a burring part 21a to provide an inner end 21b and a tubular part 22 to provide an outer end 22a. The stator structure 10 is provided at the outer end 22a. The shaft 1 has a first end 1a and a second end 1b. The first end 1a is fitted in the burring part 21a. The second end 1b is supported by the stator structure 10. The rotor frame 30 is provided in an area 60 surrounded by the cover case 20 and the stator structure 10. The rotor frame 30 has an upper surface 30a and a lower surface 30b. The rotor frame 30 has a rivet hole passing through the upper surface 30a and the lower surface 30b. The slide bearing M has a though hole M-1. The shaft 1 slidably passes through the through hole M-1. The rotor frame 30 is provided on an outside M-2 of the slide bearing. The axial direction field-type rotary magnet 50 is provided on the lower surface 30b. The eccentric weight 40 is provided on the upper surface 30a. The eccentric weight 40 has a covering part 41 extending in the direction of the shaft 1. The eccentric weight 40 has an eccentric weight part 43'. As illustrated in FIG. 1, a part of the covering part 41 is located right above the axial direction field-type rotary magnet 50.

The invention claimed is:

1. A flat type vibration motor, comprising:
   a cover case having a burring part to provide an inner end and a tubular part to provide an outer end;
   a stator structure provided at the outer end;
   a shaft having a first end and a second end, the first end being fitted in the burring part, the second end being supported by the stator structure;
   a rotor frame provided in an area surrounded by the cover case and the stator structure, the rotor frame having an upper surface and a lower surface, the rotor frame having a rivet hole passing through the upper surface and the lower surface,
   a slide bearing having a though hole, the shaft slidably passing through the through hole, the rotor frame provided on an outside of the slide bearing,
   an axial direction field-type rotary magnet provided on the lower surface,
   an eccentric weight provided on the upper surface,
   wherein the eccentric weight is a monolithic member comprising:
      a covering part extending in the direction of the shaft, and
      an eccentric weight part eccentrically provided with respect to the shaft, a part of the covering part located right above the axial direction field-type rotary magnet.

2. A flat type vibration motor as set forth in claim 1, wherein the rivet hole is located right above the axial direction field-type rotary magnet.

3. A flat type vibration motor as set forth in claim 1, wherein the eccentric weight part is an eave-shaped taper part hanging down from the covering part over an outer circumferential edge of the rotor frame to the stator structure side.

4. A flat type vibration motor as set forth in claim 1, wherein the eccentric weight has a bearing holder extending from the covering part, wherein the bearing holder is located right above the axial direction field-type rotary magnet.

5. A flat type vibration motor, comprising:
   a cover case having a burring part to provide an inner end and a tubular part to provide an outer end;
   a stator structure provided at the outer end;
   a shaft having a first end and a second end, the first end being fitted in the burring part, the second end being supported by the stator structure;
   a rotor frame provided in an area surrounded by the cover case and the stator structure, the rotor frame having an upper surface and a lower surface, the rotor frame having a rivet hole passing through the upper surface and the lower surface,
   a slide bearing having a though hole, the shaft slidably passing through the through hole, the rotor frame provided on an outside of the slide bearing,
   an axial direction field-type rotary magnet provided on the lower surface,
   an eccentric weight provided on the upper surface,
   wherein the eccentric weight monolithically comprises:
      a covering part extending in the direction of the shaft, a part of the covering part located right above the axial direction field-type rotary magnet, and
      an eave-shaped taper part hanging down from the covering part over an outer circumferential edge of the rotor frame to the stator structure side.

6. A flat type vibration motor as set forth in claim 5, wherein the rivet hole is located right above the axial direction field-type rotary magnet.

7. A flat type vibration motor as set forth in claim 5, wherein the eccentric weight has a bearing holder extending from the covering part, wherein the bearing holder is located right above the axial direction field-type rotary magnet.

* * * * *

UNITED STATES PATENT AND TRADEMARK OFFICE
CERTIFICATE OF CORRECTION

PATENT NO. : 8,698,366 B2
APPLICATION NO. : 13/022053
DATED : April 15, 2014
INVENTOR(S) : Naoki Kanai It is certified that error appears in the above-identified patent and that said Letters Patent is hereby corrected as shown below:

On the title page
Change Assignee

Item "(73) Nidec Semitsu Corporation, Ueda-shi (JP)"

To Be

Item -- (73) Nidec Seimitsu Corporation, Ueda-shi (JP) --

Signed and Sealed this
Twelfth Day of August, 2014

Michelle K. Lee
*Deputy Director of the United States Patent and Trademark Office*